(12) United States Patent
Palermo et al.

(10) Patent No.: US 9,934,062 B2
(45) Date of Patent: Apr. 3, 2018

(54) TECHNOLOGIES FOR DYNAMICALLY ALLOCATING HARDWARE ACCELERATION UNITS TO PROCESS DATA PACKETS

(71) Applicant: Intel Corporation, Santa Clara, CA (US)

(72) Inventors: Stephen T. Palermo, Chandler, AZ (US); Scott P. Dubal, Beaverton, OR (US); Rashmin N. Patel, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 72 days.

(21) Appl. No.: 15/085,454

(22) Filed: Mar. 30, 2016

(65) Prior Publication Data

US 2017/0286142 A1    Oct. 5, 2017

(51) Int. Cl.
*G06F 9/46* (2006.01)
*G06F 9/455* (2018.01)
*H04L 29/06* (2006.01)

(52) U.S. Cl.
CPC ...... *G06F 9/45558* (2013.01); *H04L 63/0428* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 63/0428

USPC ............................................................ 718/1
See application file for complete search history.

(56) References Cited

U.S. PATENT DOCUMENTS

| 7,433,311 B1* | 10/2008 | Kalyanasundaram ........................ H04L 41/5029 370/235 |
| 8,112,513 B2* | 2/2012 | Margulis ................... G06F 3/14 709/224 |
| 2003/0028673 A1* | 2/2003 | Lin .................... G06F 17/30902 709/247 |
| 2011/0010721 A1* | 1/2011 | Gupta ................... G06F 9/5077 718/103 |

* cited by examiner

*Primary Examiner* — Camquy Truong
(74) *Attorney, Agent, or Firm* — Barnes & Thornburg LLP

(57) ABSTRACT

Technologies for dynamically allocating acceleration units of a network device include a network device configured to determine a present compute usage value associated with a workload of the virtual machine, determine whether to accelerate the virtual machine as a function of the present compute usage and a compute capability usage limit, and select, in response to a determination to accelerate the virtual machine, an acceleration unit from one or more acceleration units, as a function of a type of the workload. Additionally, the network device is configured to allocate the identified acceleration unit. Other embodiments are described and claimed.

36 Claims, 8 Drawing Sheets

TECHNOLOGIES FOR DYNAMICALLY ALLOCATING HARDWARE ACCELERATION UNITS TO PROCESS DATA PACKETS

BACKGROUND

Cloud service providers typically bill for resources used within one or more server devices that provide a cloud platform. More specifically, such service providers typically bill their end-customers based on clock hours of server time and storage used by the cloud platform, as well as the amount of data transfers in and out of the particular cloud platform. Over time, as applications executed on a cloud platform add features, such as increased encryption, the cloud platform computer utilization increases and becomes constrained. Today, cloud platforms typically handle increased demands by increasing the availability of general central processing unit ("CPU") compute capabilities without taking advantage of purpose-specific hardware acceleration resources that may be present within the server device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
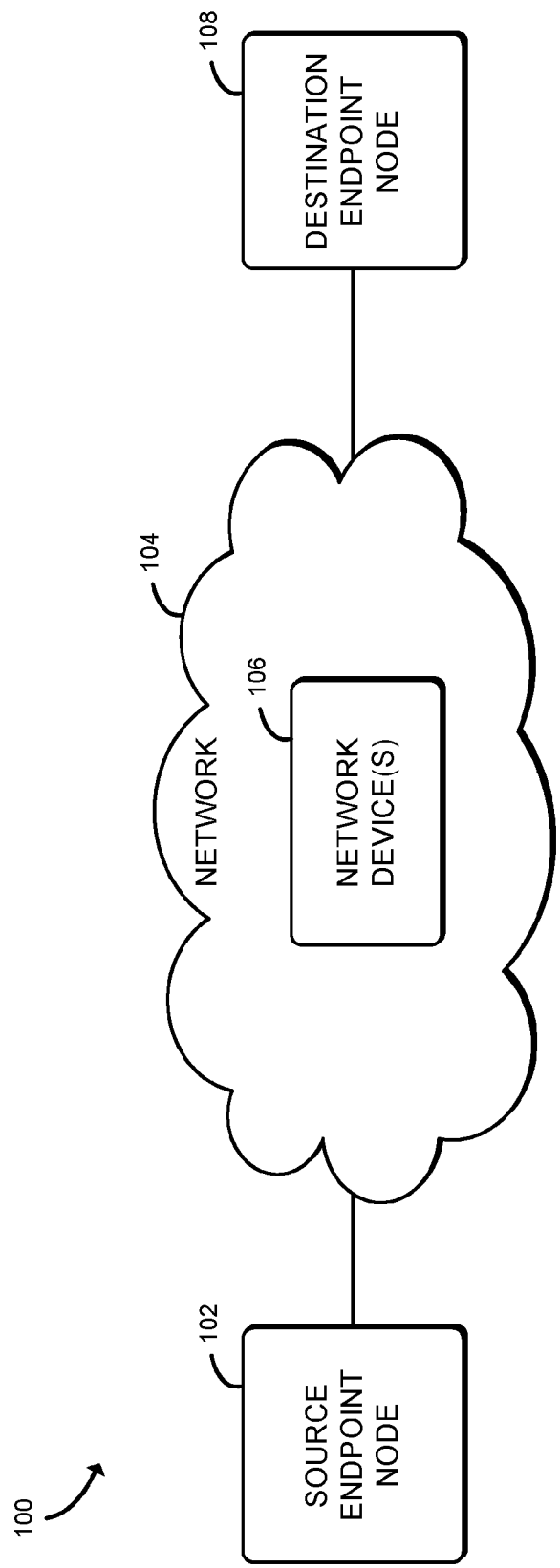
FIG. 1 is a simplified block diagram of at least one embodiment of a system that includes a network device for dynamically allocating acceleration units to assist in processing network packets.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for dynamically allocating acceleration units to assist in processing network packets includes a source endpoint node 102 and a destination endpoint node 108 in communication over a network 104 via one or more network devices 106. In use, the network device 106 facilitates the transmission of network packets (e.g., based on workload type, flow information, etc.) between the source endpoint node 102 and the destination endpoint node 108 over the network 104. As described in more detail herein, the network device 106 assigns processes to various virtual machines within the network device 106 to process the network packets. Further, depending on the types of workloads performed by the virtual machines and the amount of compute usage of each virtual machine at any given time, the network device 106 selectively allocates or deallocates specialized acceleration units to the virtual machines to assist in processing of network packets based on associated workloads, thereby reducing the processing load on the CPU.

The source endpoint node 102 may request data from the destination endpoint node 108 by sending one or more network packets that indicate the source endpoint node 102 is requesting data from the destination endpoint node 108. In response to the request, the destination endpoint node 108 may attempt to transmit a response message that includes data (e.g., a payload, a message body, etc.) via one or more network packets to the source endpoint node 102 across the network 104.

Typically, the network packets are processed by the network devices 106 prior to being forwarded along. For example, a network device 106 may allocate a number of computing resources for one or more virtual machines (VMs) to perform various network functions or services (e.g., inspection services, firewalls, encryption services, data compression services, authentication services, etc.) based on a characteristic of each network packet, such as a workload type, a flow, an identifying tuple, etc.). Accordingly, the network device 106 can process each network packet using the allocated VMs configured to perform designated network functions or services.

Figure 2:
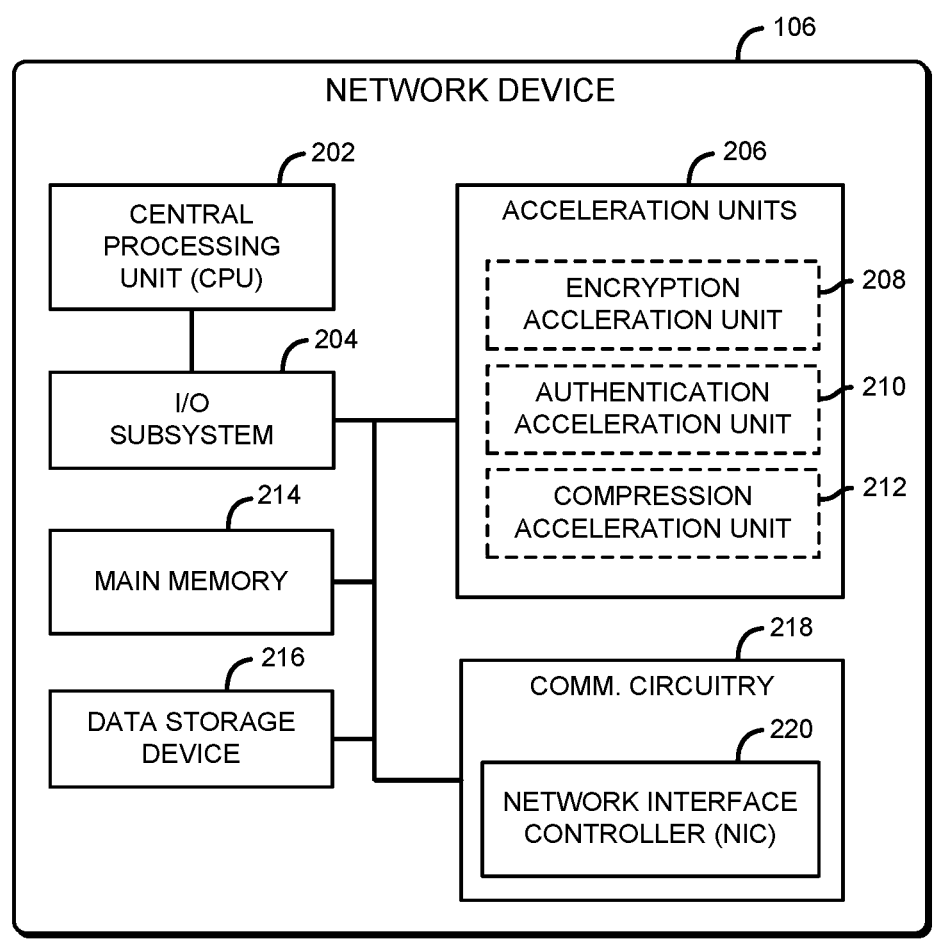
FIG. 2 is a simplified block diagram of at least one embodiment of the network device of the system of FIG. 1.

Each VM may perform the relevant processing of the network packets based on the service for which they are configured using a central processing unit (CPU) of the network device 106 (see, e.g., the CPU 202 of FIG. 2) and/or one or more acceleration units of the network device 106 (see, e.g., the acceleration units 206 of FIG. 2). In use, the network device 106 monitors each VM and determines whether the workload (e.g., service(s)) executed by any given VM is causing the present compute usage of the VM (e.g., usage of the CPU 202 on behalf of the VM) to exceed a predefined limit (e.g., 80% of assigned compute resources). In the illustrative embodiment, the "compute resources" of the CPU 202 is defined as the processing capacity of the CPU 202. If so, the network device 106 identifies and allocates a suitable purpose-specific acceleration unit to the VM to offload processing of the workload and thereby reduce the compute usage. When the workload decreases, the network device 106 may deallocate the acceleration unit for use by another VM. By dynamically allocating and deallocating purpose-specific acceleration units that are already in the hardware of the network device 106, rather than relying solely on cores of the CPU 202 assigned to handle all workloads, the network device 106 can make more efficient use of its hardware.

The source endpoint node 102 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Similarly, the destination endpoint node 108 may be embodied as any type of computation or computing device capable of performing the functions described herein, including, without limitation, a computer, a desktop computer, a smartphone, a workstation, a laptop computer, a notebook computer, a tablet computer, a mobile computing device, a wearable computing device, a network appliance, a web appliance, a distributed computing system, a processor-based system, and/or a consumer electronic device. Each of the source endpoint node 102 and the destination endpoint node 108 may include components commonly found in a computing device such as a processor, memory, input/output subsystem, data storage, communication circuitry, etc.

The network 104 may be embodied as any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Additionally, the network 104 may include any number of network devices 106 as needed to facilitate communication between the source endpoint node 102 and the destination endpoint node 108.

The network device 106 may be embodied as any type of computing device capable of facilitating wired and/or wireless network communications between the source endpoint node 102 and the destination endpoint node 108. For example, the network device 106 may be embodied as a server (e.g., stand-alone, rack-mounted, blade, etc.), a router, a switch, a network hub, an access point, a storage device, a compute device, a multiprocessor system, a network appliance (e.g., physical or virtual), or any other computing device capable of processing network packets. As shown in FIG. 2, an illustrative network device 106 includes a central processing unit (CPU) 202, an input/output (I/O) subsystem 204, a set of acceleration units 206 including an encryption acceleration unit 208, an authentication acceleration unit 210, and compression acceleration unit 212. The illustrative network device also includes a main memory 214, a data storage device 216, and communication circuitry 218 that includes a network interface card (NIC) 220. Of course, in other embodiments, the network device 106 may include other or additional components, such as those commonly found in a network device (e.g., virtualization services, drivers, operating systems, schedulers, etc.). Additionally, in some embodiments, one or more of the illustrative components may be incorporated in, or otherwise form a portion of, another component. For example, in some embodiments, the main memory 214, or portions thereof, may be incorporated in the CPU 202.

The CPU 202 may be embodied as any type of processor capable of performing the functions described herein. The CPU 202 may be embodied as a single or multi-core processor(s), digital signal processor, microcontroller, or other processor or processing/controlling circuit. The I/O subsystem 204 may be embodied as circuitry and/or components to facilitate input/output operations with the CPU 202, the acceleration units 206, the main memory 214, and other components of the network device 106. For example, the I/O subsystem 204 may be embodied as, or otherwise include, memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In some embodiments, the I/O subsystem 204 may form a portion of a system-on-a-chip (SoC) and be incorporated, along with one or more of the CPU 202, the acceleration units 206, the main memory 214, and other components of the network device 106, on a single integrated circuit chip.

The acceleration units 206 may be embodied as one or more devices and/or circuits capable of the functions described herein, including accelerating network packet processing tasks and/or performing other parallel computing operations that would benefit from accelerated processing. Each of the acceleration units 206 may include one or more of a field programmable gate array (FPGA), an application-specific integrated circuit (ASIC), a digital signal processor (DSP), an array of specialized processor cores for performing encryption, authentication, and/or compression, or other specialized circuitry to handle specific types of tasks (e.g., network processing tasks). The illustrative acceleration units 206 include one or more of an encryption acceleration unit 208, an authentication acceleration unit 210, and a compression acceleration unit 212. The encryption acceleration unit 208 may be capable of performing accelerated encryption and implement a specialized encryption instruction set (e.g., Intel Advanced Encryption Standard—New Instructions). For example, a VM may use the encryption acceleration unit 208 to assist in securing web server traffic. The authentication acceleration unit 210 may be capable of performing authentication services based on calculation-intensive algorithms such as RSA or other symmetric or asymmetric key based systems. The compression acceleration unit 212 may be capable of accelerated data compression and decompression. For example, the compression acceleration unit 212 may include specialized circuitry to implement algorithms such as Lempel-Ziv 1977, DEFLATE, and/or variations thereof.

As described previously, use of the acceleration units 206 can free up resources of the CPU 202 (e.g., memory, cache, processor cores, communication bus bandwidth, etc.), which can be dedicated to other tasks, such as application performance management. It should be appreciated that, in some embodiments, one or more of the acceleration units 206 may be embodied as a peripheral device (e.g., on a discrete peripheral cards), or may be located on the CPU 202 motherboard or on the CPU 202 die.

The main memory 214 may be embodied as any type of volatile or non-volatile memory or data storage capable of performing the functions described herein. In operation, the main memory 214 may store various data and software used during operation of the network device 106 such as operating systems, applications, programs, libraries, and drivers. The data storage device 216 may be embodied as any type of device or devices configured for short-term or long-term storage of data such as, for example, memory devices and circuits, memory cards, hard disk drives, solid-state drives, or other data storage devices. The data storage device 216 may include a system partition that stores data and firmware code for the network device 106. The data storage device 216 may also include an operating system partition that stores data files and executables for an operating system of the network device 106.

The communication circuitry 218 may be embodied as any communication circuit, device, or collection thereof, capable of enabling communications over the network 104 between the network device 106 and the source endpoint node 102, another network device 106, and/or the destination endpoint node 108. The communication circuitry 218 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 218 includes a network interface controller (NIC) 220. The NIC 220 may be embodied as one or more add-in-boards, daughtercards, network interface cards, controller chips, chipsets, or other devices that may be used by the network device 106 to connect the source endpoint node 102, the destination endpoint node 108, and/or another network device 106. For example, the NIC 220 may be embodied as an expansion card coupled to the I/O subsystem 204 over an expansion bus, such as PCI Express, part of an SoC that includes one or more processors, or included on a multichip package that also contains one or more processors.

In some embodiments, the NIC 220 may include a local processor (not shown) and/or a local memory (not shown) that are both local to the NIC 220. In such embodiments, the local processor of the NIC 220 may be capable of performing one or more of the functions of the CPU 202 described herein. Additionally or alternatively, in such embodiments, the local memory of the NIC 220 may be integrated into one or more components of the network device 106 at the board level, socket level, chip level, and/or other levels.

Figure 3:
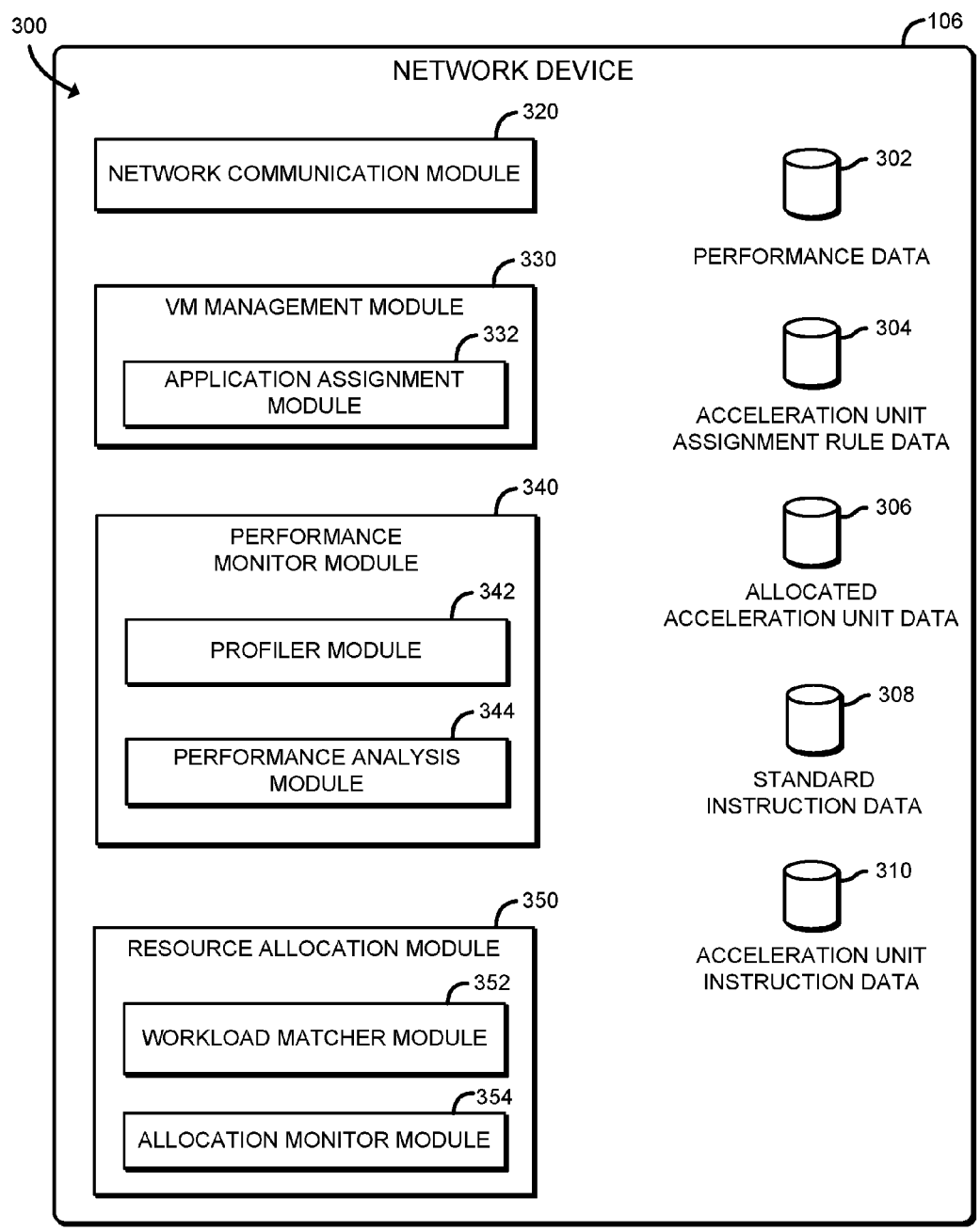
FIG. 3 is a simplified block diagram of at least one embodiment of an environment that may be established by the network device of FIG. 2.

Referring now to FIG. 3, in an embodiment, the network device 106 establishes an environment 300 during operation. The illustrative environment 300 includes a network communication module 320, a virtual machine management module 330, a performance monitor module 340, and a resource allocation module 350. The various modules of the environment 300 may be embodied as hardware, firmware, software, or a combination thereof. As such, in some embodiments, one or more of the modules of the environment 300 may be embodied as circuitry or collection of electrical devices (e.g., a network communication circuit 320, a virtual machine management circuit 330, a performance monitor circuit 340, a resource allocation circuit 350, etc.).

It should be appreciated that, in such embodiments, one or more of the network communication circuit 320, the virtual machine management circuit 330, the performance monitor circuit 340, and the resource allocation circuit 350 may form a portion of one or more of the CPU 202, the I/O subsystem 204, and/or other components of the network device 106. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the CPU 202 or other components of the network device 106.

In the illustrative environment 300, the network device 106 additionally includes performance data 302, acceleration unit assignment rule data 304, allocated acceleration unit data 306, standard instruction data 308, and acceleration unit instruction data 310, each of which may be stored in the main memory 214 and/or the data storage device 216 of the network device 106. Further, each of the performance data 302, the acceleration unit assignment rule data 304, the allocated acceleration unit data 306, the standard instruction data 308, and the acceleration unit instruction data 310 may be accessed by the various modules and/or sub-modules of the network device 106. It should be appreciated that the network device 106 may include other components, sub-components, modules, sub-modules, and/or devices commonly found in a network device, which are not illustrated in FIG. 3 for clarity of the description.

The network communication module 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network device 106, respectively. To do so, the network communication module 320 is configured to receive and process network packets from one computing device (e.g., the source endpoint node 102, another network device 106, the destination endpoint node 108) and to prepare and transmit network packets to another computing device (e.g., the source endpoint node 102, another network device 106, the destination endpoint node 108). Accordingly, in some embodiments, at least a portion of the functionality of the network communication module 320 may be performed by the communication circuitry 218, and more specifically by the NIC 220.

The virtual machine management module 330, which may be embodied as hardware, firmware, software, virtualized hardware, emulated architecture, and/or a combination thereof as discussed above, is configured to manage the virtual machines of the network device 106. For example, the virtual machine management module is configured to initialize virtual machines within the network device 106 (e.g., for use in processing network packets) and to assign limits to each virtual machine (e.g., defining an amount of compute capability of the CPU 202 each virtual machine may use). The illustrative virtual machine management module 330 includes an application assignment module 332 that is configured to assign applications to each virtual machine. As described in more detail below, each application has one or more associated processes that are executed throughout the course of performing a workload. It should be appreciated that the application assignment module 332 of the virtual machine management module 330 may be separately embodied as hardware, firmware, software, virtualized hardware, emulated architecture, and/or a combination thereof.

The performance monitor module 340, which may be embodied as hardware, firmware, software, virtualized hardware, emulated architecture, and/or a combination thereof as discussed above, is configured to monitor one or more performance metrics of various physical and/or virtual resources of the network device 106 and analyze the performance metrics to determine whether any of the virtual machines may benefit from assistance from the acceleration units 206. Such performance metrics may include any type of data that indicates the types of workloads executed by the virtual machines. In some embodiments, the performance monitoring module 340 may be configured to generate and store such performance metrics in the performance data 302.

To monitor and analyze the performance metrics, the illustrative performance monitor module 340 includes a profiler module 342 and a performance analysis module 344. The profiler module 342 is configured to monitor and record usage of various system resources and generate performance profiles associated with each virtual machine based on the monitored and recorded usage of the various system resources. The performance profiles may include any information that characterizes the workloads of the VMs, such as statistical information of the loads on the CPU 202 caused by each virtual machine, types of instructions executed by the CPU 202 (e.g., a percentage of branch instructions, a percentage of arithmetic instructions, etc.) for each virtual machine, frequency of reads and writes to memory (e.g., main memory 214) for each virtual machine, sizes of blocks of data read from and written to memory (e.g., main memory 214) for each virtual machine, cache hits/misses, thread occupancy, translation lookaside buffer (TLB) misses, page faults, etc.

In some embodiments, to monitor various system resources of the network device 106, the profiler module 342 may be configured to periodically read hardware and/or software (e.g., an operating system (OS)) performance counters. For example, in some embodiments, a shim layer between application processing interface (API) calls and a device driver may intercept the API calls. In another example, specially defined APIs may be used between the application and the profiler module 342.

Additionally, the profiler module 342 may be configured to store information in the performance profiles about the types of network packets being received and processed by a VM. For example, the profiler module 342 may determine that the network packets received by a VM contain public keys and accordingly, are indicative of an encryption or authentication workload. Further, the profiler module 342 may be configured to identify processes executed by the various VMs. In some embodiments, the profiler module 342 may identify a primary process of each VM, such as a process that utilizes a majority of compute resources assigned to the VM at various times (e.g., every second) and store the process identifiers in the corresponding performance profile for a virtual machine. The process identifiers may be embodied as process names, process numbers, and/or other indicia that uniquely identifies a process.

The performance analysis module 344 is configured to analyze the performance profile associated with each virtual machine and determine whether each virtual machine may benefit from the use of one or more of the acceleration units 206. For example, in some embodiments, the performance analysis module 344 may be configured to compare an assigned compute capability usage limit (i.e., a limit on an amount of compute resources assigned to the virtual machine by the virtual machine management module 330) to a present compute usage value of the virtual machine. In such an embodiment, if the present compute usage value of the virtual machine exceeds the assigned compute capability usage limit assigned to the virtual machine, then the performance analysis module 344 may determine that the virtual machine may benefit from the use of one or more of the acceleration units 206.

It should be appreciated that each of the profiler module 342 and the performance analysis module 344 of the performance monitor module 340 may be separately embodied as hardware, firmware, software, virtualized hardware, emulated architecture, and/or a combination thereof. For example, the profiler module 342 may be embodied as a hardware component, while the performance analysis module 344 is embodied as a virtualized hardware component or as some other combination of hardware, firmware, software, virtualized hardware, emulated architecture, and/or a combination thereof.

The resource allocation module 350, which may be embodied as hardware, firmware, software, virtualized hardware, emulated architecture, and/or a combination thereof as discussed above, is configured to dynamically allocate and deallocate the acceleration units 206 as the VMs perform their respective workloads. To do so, the illustrative resource allocation module 350 includes a workload matcher module 352 and an allocation monitor module 354 that utilize one or more acceleration unit assignment rules to generate allocated acceleration unit data. The acceleration unit assignment rules include any type of data that indicate a set of rules, or policies, usable to identify a type associated with each of the workloads and compute usage values at which it may be appropriate to allocate one or more acceleration units to a VM. In some embodiments, the acceleration unit assignment rules may identify characteristic resource utilizations or process identifiers, and an indication of one or more of the acceleration units 206 that are specialized for processing that identified type of workload. For example, the acceleration unit assignment rules may indicate that process identifiers that include one or more of the strings "encrypt", "decrypt", "secure", or other indicators of encryption should receive processing capacity from the encryption acceleration unit 208 when the VM executing the associated process, or processes, exceeds a predefined compute capability usage limit.

Additionally or alternatively, the acceleration unit assignment rules may associate resource utilization statistics (e.g., frequency of memory accesses, types of mathematical instructions executed, etc.) that are characteristic of encryption workloads with rules to allocate corresponding amounts of processing capacity of the encryption acceleration unit 208. In some embodiments, the acceleration unit assignment rules may specify an amount of processing capacity in terms of bytes per second of throughput, calculations per second of throughput, or other measurement of throughput a VM should be allocated based on a given degree of resource utilization that the VM is experiencing.

Additionally or alternatively, the acceleration unit assignment rules may specify a number of cycles, lengths of processing time partitions, and/or physical partitions ("sub-units") of the encryption acceleration unit 208 to be allocated to provide the prescribed amount of processing capacity to the VM performing the encryption workload. Similarly, the acceleration unit assignment rules may include similar information for allocating specific amounts of the authentication acceleration unit 210 or the compression acceleration unit 212, to assist in performing authentication or compression/decompression workloads, respectively. In some embodiments, the amounts of capacity specified in the acceleration unit assignment rules may be determined empirically and continually refined by the network device 106. For example, in some embodiments, the network device 106 may assign an initial amount of capacity of an acceleration unit 206 specified in the acceleration unit assignment rules to a VM in response to determining that the compute usage value of the VM is in excess of the compute capability usage limit. As described above, the acceleration unit assignment rules may specify amounts of capacity of the various hardware acceleration units 206 to be assigned for various workload types and compute usage values. After assigning the specified amount of capacity to the VM, the network device 106 may determine that the resulting compute usage value associated with the workload of the VM is still in excess of the compute capability usage limit. In response, the network device 106 may increase the amount of capacity of the acceleration units 206 assigned to the VM. Subsequently, the network device 106 may determine that the resulting compute usage value is below the compute capability usage limit. In response, the network device 106 may store the increased amount of capacity in the acceleration unit assignment rules in association with the workload type and the compute usage value. In other embodiments, the amounts of capacity specified in the acceleration unit assignment rules are fixed.

The allocated acceleration unit data includes any type of data usable to identify an amount of allocated acceleration units. For example, the allocated acceleration unit data may include data indicating amounts of processing capacity of the acceleration units 206 that have been allocated to each VM and which VMs the processing capacities have been allocated to. In some embodiments, the acceleration unit assignment rules may be stored in the acceleration unit assignment rule data 304 and the allocated acceleration unit data may be stored in the allocated acceleration unit data 306.

The workload matcher module 352 of the resource allocation module 350 is configured to match the performance profiles associated with the VMs, as indicated in the performance data 302, with the corresponding acceleration unit assignment rules. Accordingly, the resource allocation module 350 may dynamically allocate and deallocate the acceleration units 206. The allocation monitor module 354 is configured to operate contemporaneously with the workload matcher module 352 and continually update the allocated acceleration unit data to indicate the amounts of processing capacity of the acceleration units 206 that have been allocated and which VMs the processing capacities have be allocated to. As described above, the performance profiles, such as may be stored in the performance data 302, are indicative of the workload types associated with each virtual machine.

In some embodiments, when the resource allocation module 350 allocates processing capacity of one of the acceleration units 206 to a VM, the VM may migrate a thread from executing a set of standard instructions with the CPU 202 to executing specialized acceleration unit instructions for use by the allocated acceleration unit 206 to process the workload. For example, in such embodiments wherein processing of the workload is not intended to be performed by the CPU 202, the acceleration unit instructions may be embodied as an instruction set that indicates which acceleration unit 206 is to be used to process the workload. In such an embodiment, the acceleration unit instructions may include a particular architecture of the acceleration unit 206. When the present compute of the VM drops below the compute capability usage limit, the resource allocation module 350 is configured to deallocate at least a portion of the allocated processing capacity of the respective acceleration unit 206. In such embodiments, the VM may then migrate from using the acceleration unit instructions usable by the applicable acceleration unit 206 back to using the standard instructions usable by the CPU 202. In some embodiments, the standard instructions may be stored in the standard instruction data 308. Additionally or alternatively, in some embodiments, the acceleration unit instructions may be stored in the acceleration unit instruction data 310.

It should be appreciated that each of the workload matcher module 352 and the allocation monitor module 354 of the resource allocation module 350 may be separately embodied as hardware, firmware, software, virtualized hardware, emulated architecture, and/or a combination thereof. For example, the workload matcher module 352 may be embodied as a hardware component, while the allocation monitor module 354 is embodied as a virtualized hardware component or as some other combination of hardware, firmware, software, virtualized hardware, emulated architecture, and/or a combination thereof.

Figure 4:
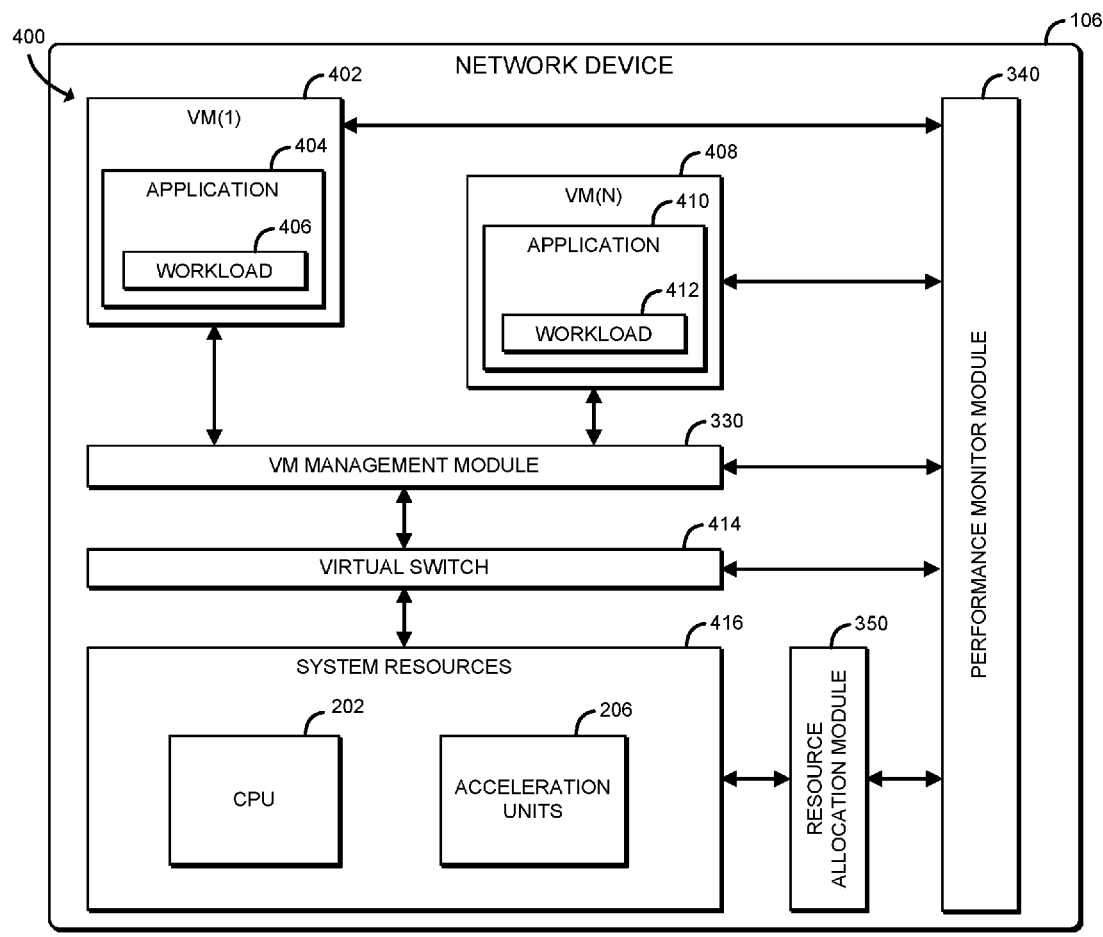
FIG. 4 is a simplified block diagram of another embodiment of an environment that may be established by the network device of FIG. 2.

Referring now to FIG. 4, an operational environment 400 of the network device 106 is shown. The illustrative operational environment 400 includes multiple virtual machines, the virtual machine management module 330, the performance monitor module 340, and the resource allocation module 350 of FIG. 3, as well as a virtual switch 414. In the illustrative operational environment 400, the network device 106 is executing a first virtual machine, which is designated as VM(1) 402, and a second virtual machine, which is designated as VM(N) 408 (i.e., the "Nth" virtual machine running on the network device 106, wherein "N" is a positive integer and designates one or more additional virtual machines running on the network device 106). Each of the VM(1) 402 and the VM(N) 408 include a corresponding application, a first application 404 having a corresponding workload 406, and an "Nth" application 410 having a corresponding workload 412, respectively. It should be appreciated that one or more of the VMs 402, 408 may run more than one application. The applications 404, 410 may indicate any type of service (i.e., workload) or other network processing function presently being performed via the VMs 402, 408 on the network packets, such as user authentication, encrypting network traffic, real time data compression, etc. In some embodiments, the VMs 402, 408 may be configured to function as a service function chain comprised of a number of VMs to perform certain services on the network packets based on various factors, such as type, flow, workload, destination, etc.

The virtual switch 414 may be configured to manage the internal data transfer of network traffic related information. In the illustrative embodiment, the virtual switch 414 is a logical switch initialized and managed by a NIC (e.g., the NIC 220 of FIG. 2) of the network device 106. It should be appreciated that, in other embodiments, the virtual switch 414 may be embodied by other hardware components and/or software. In some embodiments, the performance monitor module 340 may receive mirrored and/or duplicated network packets that are to be processed internally (i.e., the applications 404, 410 running on the local VMs 402, 408) and provide data from the network packets to the performance monitor module 340 for storage in the performance profiles, described above, to facilitate identifying the types and intensities of the respective workloads of each virtual machine 402, 408 at any given time. Accordingly, the virtual switch 414 may be configured to facilitate the transfer of the mirrored and/or duplicated network traffic between the VMs 402, 408 and the performance monitor module 340.

The illustrative operational environment 400 additionally includes system resources 416 that include the various components of the network device 106, such as those components of the illustrative network device 106 of FIG. 2. The illustrative system resources include the CPU 202 and the acceleration units 206 of FIG. 2. As shown, the resource allocation module 350 is communicatively coupled to the system resources 416, such that the resource allocation module 350 can allocate and deallocate processing capacity of the acceleration units 206 to the virtual machines 402, 408 on an as-desired basis.

Figure 5:
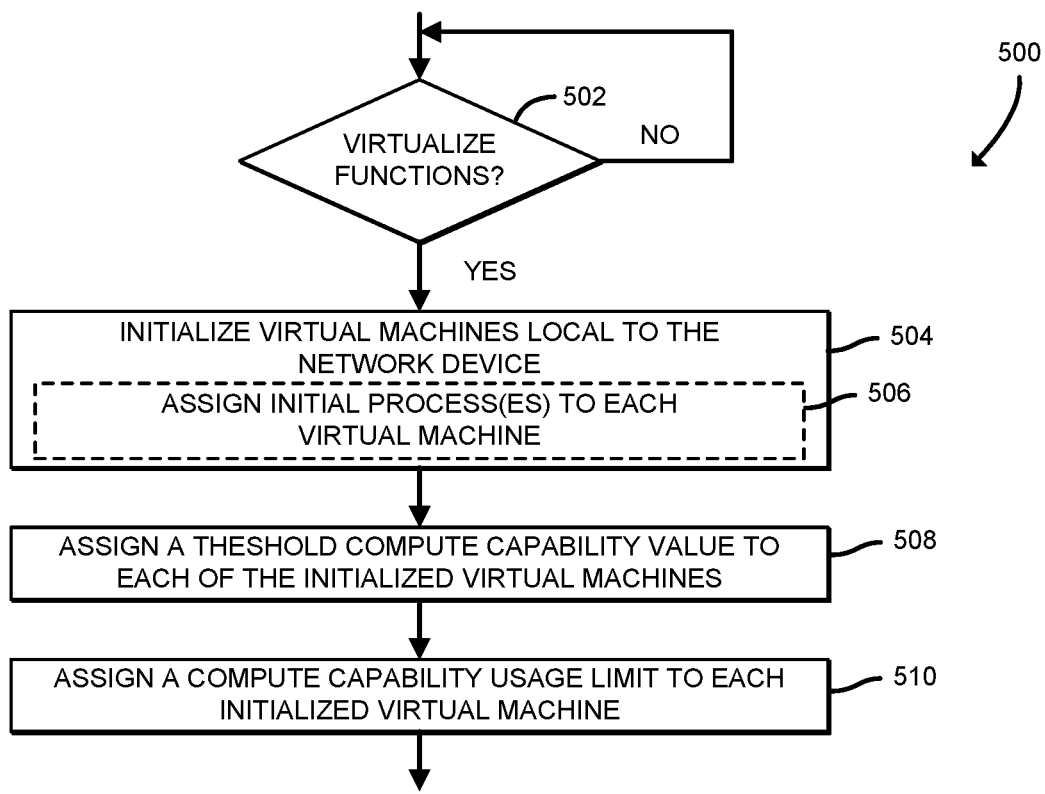
FIG. 5 is a simplified flow diagram of at least one embodiment of a method for initializing virtual machines of the network device of FIG. 2 to process network packets.

Referring now to FIG. 5, in use, the network device 106 may execute a method for initializing virtual machines of the network device 106 (e.g., VM(1) 402 and VM(N) 408 of the illustrative network device 106 of FIG. 4). The method 500 begins with block 502, in which the network device 106 determines whether a request to virtualize one or more network functions has been received. In other words, the network device 106 determines whether a request has been received to initialize one or more virtual machines to perform one or more virtualized functions (e.g., network traffic encryption, authentication, data compression, etc.). If the network device 106 determines that a request to begin virtualization of the network function(s) has not been received, the method loops back to block 502 to continue monitoring for the virtualization request. If the network device 106 determines that a request to begin virtualization has been received, the method 500 advances to block 504. In block 504, the network device 106 initializes virtual machines (e.g., the virtual machines 402, 408) local to the network device 106. To do so, in block 506, the network device 106 assigns one or more processes (e.g., applications 404, 410 of FIG. 4) having associated workloads (e.g., workloads 406, 412 of FIG. 4) to the initialized virtual machines (e.g., VMs 402, 408 of FIG. 4).

In block 508, the network device 106 assigns a threshold compute capability value to each of the initialized virtual machines (e.g., virtual machines 402, 408 of FIG. 4). In an illustrative embodiment, the threshold compute capability may be a percentage of utilization of one or more cores of the CPU 202, such as 90% of the total compute capability of one core to the virtual machine 402, 90% of the total compute capability of another core to the virtual machine 408, and other percentages of other cores to other initialized virtual machines. Further, in block 510, the network device 106 assigns a compute capability usage limit to each initialized virtual machine 402, 408. In some embodiments, the network device 106 may set the compute capability usage limit to 80% or some other percentage of the threshold compute capability value assigned to each virtual machine 402, 408. The compute capability usage limit is a limit at which the associated virtual machine is identified as being at risk of overloading and thereby causing delays or dropping network packets.

Moreover, in the illustrative embodiment, when a virtual machine is operating at or above the compute capability usage limit, the virtual machine becomes eligible to receive assistance from an acceleration unit, as described in more detail herein. Accordingly, using the example percentages given above, a virtual machine operating at 72% (90%*80%) of the total compute capability of the assigned core of the CPU 202 would be identified as eligible to receive processing capacity of one or more of the acceleration units 206. In some embodiments, the network device 106 allocates a portion of the processing capacity of one or more of the acceleration units 206 to one or more of the virtual machines upon initialization. An example process for allocating and allocating and deallocating acceleration units to the virtual machines is described below in FIGS. 6 through 8.

Figure 6:
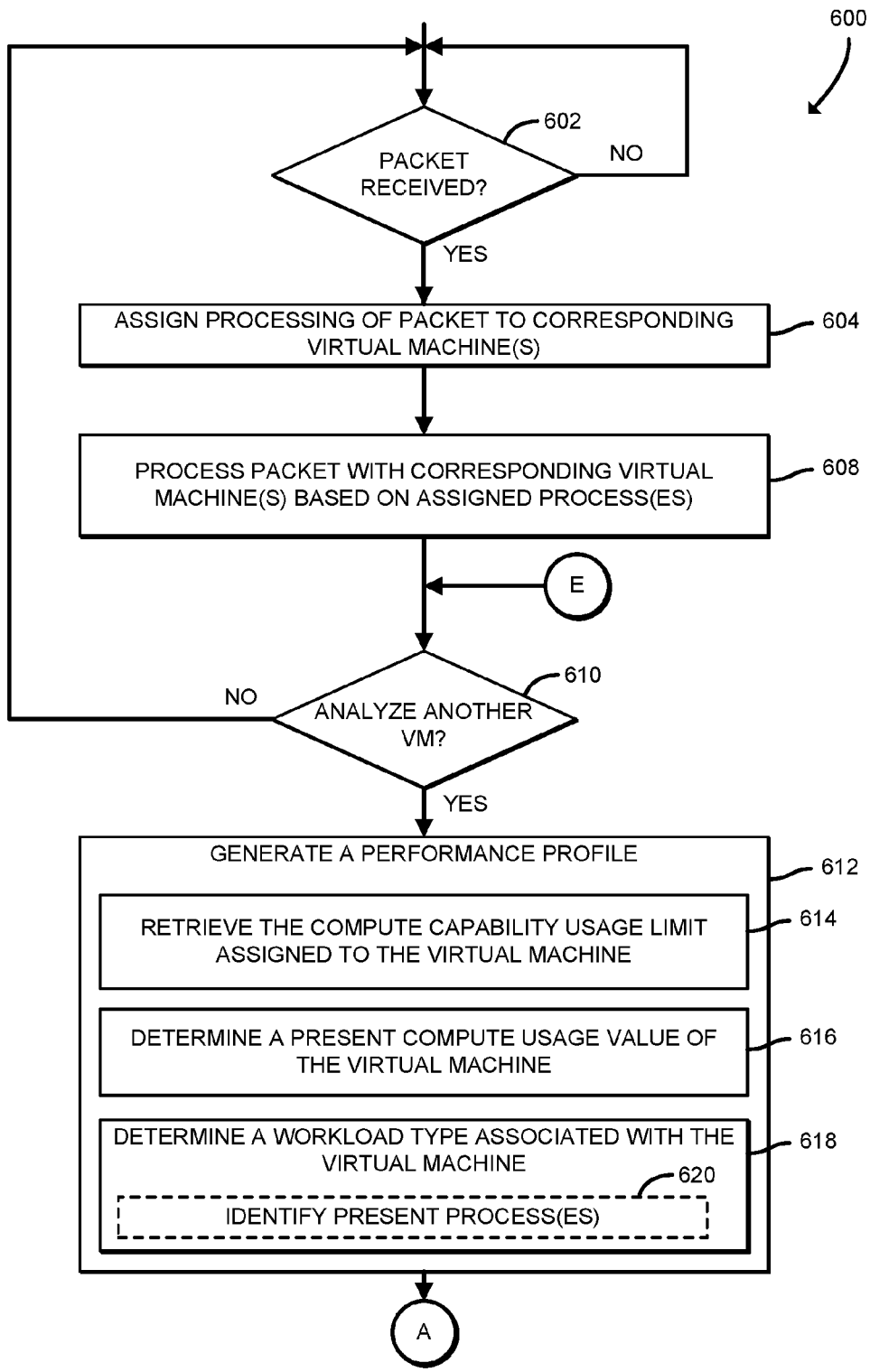
FIGS. 6-8 are a simplified flow diagram of at least one embodiment of a method for dynamically allocating acceleration units of the network device of FIG. 2 to the virtual machines initialized in method of FIG. 5.
Figure 7:
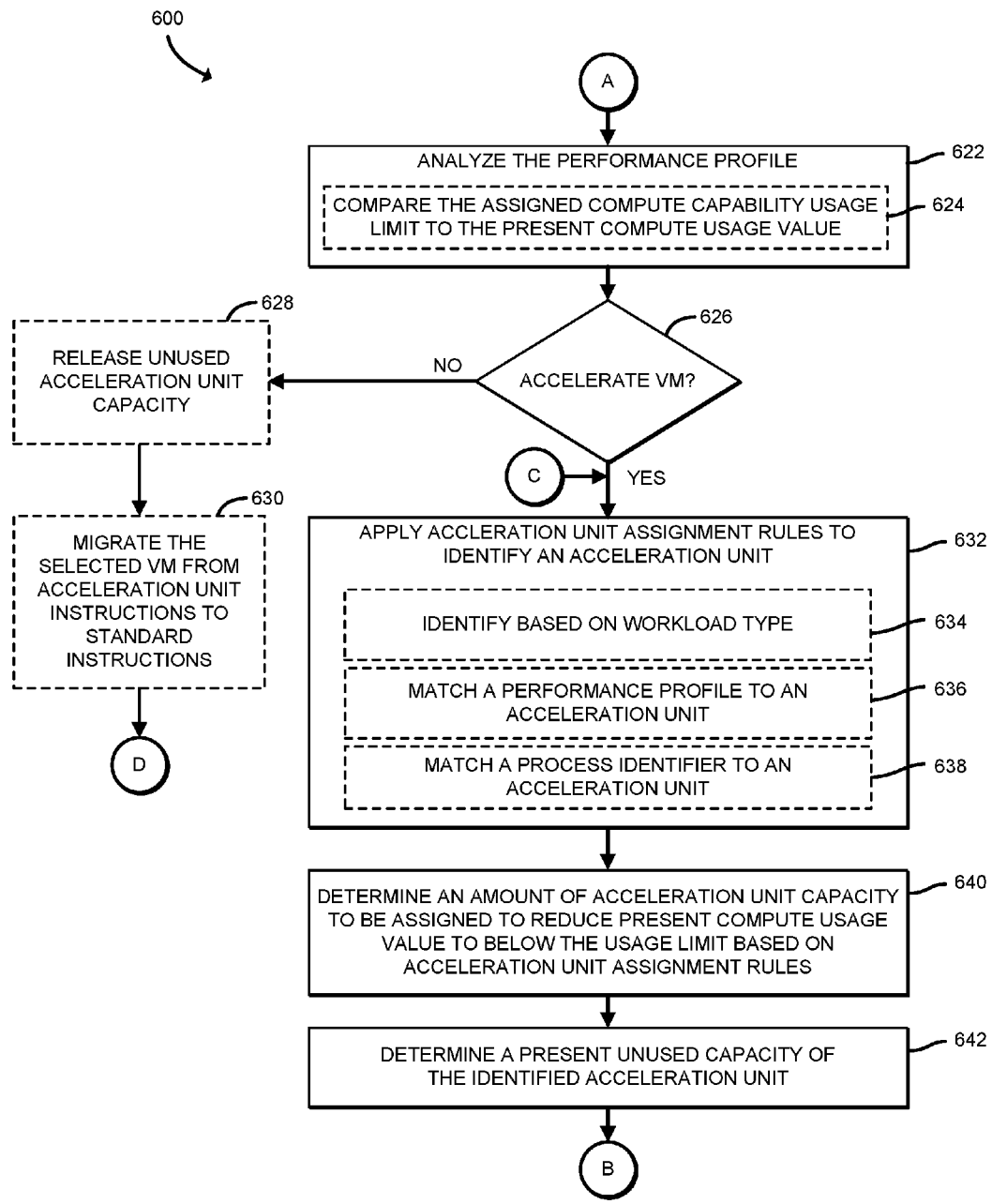
Figure 8:
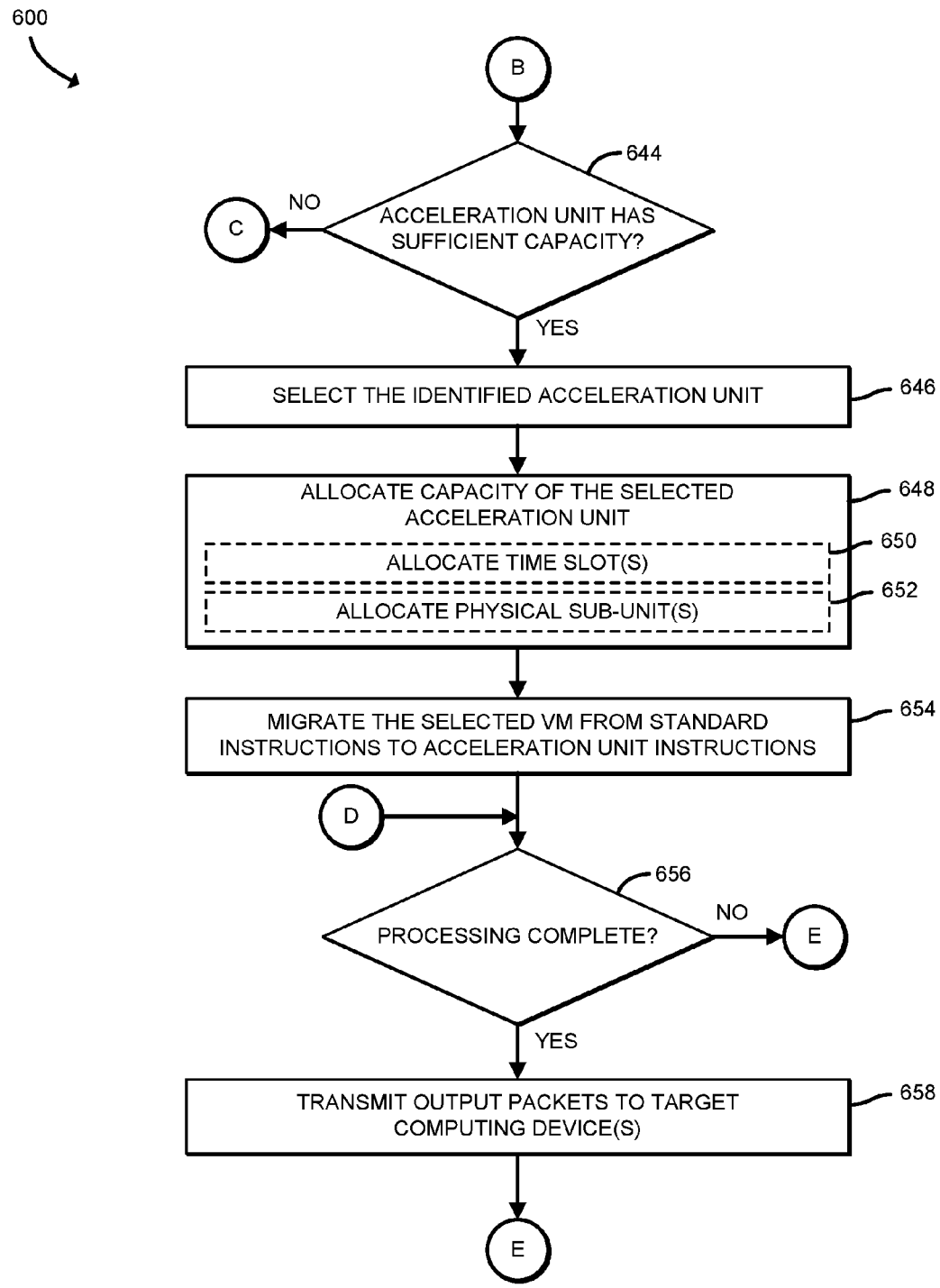

Referring now to FIGS. 6 through 8, in use, the network device 106 may execute a method 600 for dynamically allocating acceleration units (e.g., the acceleration units 206 of FIG. 2) of the network device 106 to process network packets. The method 600 begins with block 602, in which the network device 106 determines whether a network packet has been received, such as from the source endpoint node 102, another network device 106, or the destination endpoint node 108. Further, in block 604, the network device 106 assigns the packet to the corresponding virtual machine (e.g., VM(1) 402, VM(N) 408, etc.) based on the application (i.e., workload) executed by the virtual machine. For example, as described previously in the illustrative network device 116 of FIG. 4, the virtual switch 414 is configured to forward a received network packet to the respective virtual machine based on the assigned virtualized functions (e.g., authentication, encryption, and/or compression, etc.) associated with their respective application 404. Referring back to FIG. 6, in block 608, the network device 106 processes the packet with the corresponding virtual machine, based on the assigned processes of the virtual machine.

In block 610, the network device 106 determines whether to analyze a virtual machine. For example, in some embodiments, the network device 106 may operate a timer that sets an interval at which the network device 106 is to analyze the virtual machines to determine whether to allocate or deallocate processing capacity of an acceleration unit 206. Additionally or alternatively, in some embodiments, the network device 106 may sequentially cycle through each virtual machine, starting with the virtual machine 402 and ending with the Nth virtual machine 408, and then looping back to the first virtual machine 402, and so on.

If the network device 106 determines not to analyze another virtual machine at the present time, the network device loops back to block 602 to monitor for another network packet; otherwise the method 600 advances to block 612 in which the network device 106 generates a performance profile associated with one of the virtual machines. As described above, a performance profile may include any information that characterizes the workload of a VM. As indicated in block 614, in generating the performance profile, the network device 106 may retrieve a compute capability usage limit (e.g., the compute capability usage limit assigned to the virtual machine in block 510 of the method 500 of FIG. 5).

Additionally, in block 616, the network device 106 determines a present compute usage value of the virtual machine. For example, the network device 106 may determine that the virtual machine is operating at 82% of the assigned threshold compute capability value that was assigned to the virtual machine in block 508. In block 618, the network device 106 may determine a workload type associated with the virtual machine. For example, based on the performance profile, the network device 106 may determine a type of workload the virtual machine is performing, such as an encryption workload, an authentication workload, a compression workload, or another type of workload. As described above, the performance profile may include any information that characterizes the workload of the VM, such as statistical information about the usage of resources available to the virtual machine (e.g., CPU usage, memory usage, etc.), types of instructions executed, and/or the types of data being received in the network packets transmitted to the VM.

In some embodiments, in block 620, the network device 106 may identify the main, or primary, processes that are utilizing a majority of the available compute capacity. To determine the workload type, for example, the network device 106 may identify one or more process names or other unique identifiers associated with the main process or processes presently executed by the selected virtual machine, which may be indicative of the type of workload being performed by the virtual machine. For example, the network device 106 may execute the Linux "top" command to obtain names of processes that are consuming most (i.e., an amount that satisfies a threshold, such as 90%) of the compute resources allocated to the virtual machine.

In block 622 of FIG. 7, the network device 106 analyzes the performance profile generated in block 618. To do so, in some embodiments, in block 624, the network device 106 may compare the assigned compute capability usage limit to the present compute usage value. At block 626, the network device 106 determines whether to accelerate the virtual machine. For example, in some embodiments, if the present compute usage value is greater than the assigned compute capability usage limit, then the network device 106 determines to accelerate the virtual machine. If the network device 106 determines to accelerate the virtual machine, the method 600 advances to block 632, in which the network device 106 applies the acceleration unit assignment rules to identify an acceleration unit 206 to allocate to the virtual machine.

In applying the acceleration unit assignment rules to identify the acceleration unit to allocate to the virtual machine, the network device 106 may identify the acceleration unit 206 based on a type of the workload of the virtual machine (e.g., the workload 406 of VM(1) 402, the workload 412 of VM(N) 408, etc.), as indicated in block 634. As described previously, the workload may be an encryption workload, an authentication workload, and/or a compression workload. To identify the acceleration unit to allocate, in some embodiments, the network device 106 may match a performance profile associated with the workload to an identification of an acceleration unit 206, as indicated in block 636. Additionally or alternatively, in some embodiments, the network device 106 may match a process name (e.g., "encrypt") associated with the workload to an identification of one of the acceleration units 206 (e.g., the encryption acceleration unit 208) as indicated in block 638. For example, the network device 106 may compare the names of the processes identified as using most of the compute resources (e.g., by execution of the Linux "top" command), as described above, to a list of applications that are known to benefit from hardware acceleration, to determine if a match exists. The list of applications known to benefit from hardware acceleration may be stored in the acceleration unit assignment rule data 304. Further, each application in the list may be listed in association with an identifier of the type of hardware acceleration unit 206 (e.g., encryption, compression, etc.) or identifiers of the particular hardware acceleration units 206 present in the network device 106 that are usable to accelerate the application.

In block 640, the network device 106 determines an amount of acceleration unit capacity usable to reduce the present compute usage value of the virtual machine to be less than the assigned compute capability usage limit. In the illustrative embodiment, the network device 106 may determine the amount of acceleration unit capacity based on the acceleration unit assignment rules. As described previously, the acceleration unit assignment rules specify the amount of acceleration unit capacity to be assigned to a VM to reduce the compute usage value by a given amount. In an example, the network device 106 may determine, from the acceleration unit assignment rules, an amount of acceleration unit capacity usable to reduce the compute usage value by at least 3%, to reduce the 82% compute usage value to a percentage less than or equal to 79%. In furtherance of the example, the acceleration unit assignment rules may indicate that 2% of the processing capacity of the encryption acceleration unit 208 would be appropriate in order to reduce the compute usage of the selected virtual machine by 3%, for an encryption workload.

In block 642, the network device 106 determines the present unused capacity of the identified acceleration unit (e.g., the encryption acceleration unit 208). In the illustrative embodiment, the network device 106 references the allocated acceleration unit data 306 to determine the present unused capacity of the identified acceleration unit (e.g., the encryption acceleration unit 208). In block 644 of FIG. 7, the network device 106 determines whether the identified acceleration unit (e.g., the encryption acceleration unit 208) has sufficient unallocated capacity to be assigned to the virtual machine. If the network device 106 determines that the acceleration unit does not have sufficient unallocated capacity to be assigned to the virtual machine, the method loops back to block 632 to again apply the acceleration unit assignment rules to identify an acceleration unit. In some embodiments, in block 632, the network device 106 may identify another acceleration unit (not shown) that is configured to perform encryption processes. In other embodiments, for example in such embodiments wherein there are no other available acceleration units 206 configured to perform encryption, the network device 106 loops through blocks 632 through 644, until the desired capacity of the applicable acceleration unit (e.g., the encryption acceleration unit 208) becomes available. Otherwise, if the network device 106 determines in block 644 that the acceleration unit does have sufficient capacity, then the method 600 advances to block 646 to select the identified acceleration unit (e.g., the encryption acceleration unit 208) and allocate at least a portion of the selected acceleration unit to the virtual machine.

In block 648, the network device 106 allocates the specified capacity of the selected acceleration unit (e.g., the encryption acceleration unit 208) to reduce the present compute usage value of the virtual machine to be below the assigned compute capability usage limit. Following the example given above, the network device 106 may assign 2% of the capacity of the encryption acceleration unit 208 to the virtual machine. In performing the allocation of block 648, the network device 106 may allocate one or more processing time slots of the acceleration unit (e.g., the encryption acceleration unit 208) to the virtual machine, as indicated in block 650. Additionally or alternatively, as indicated in block 652, the network device 106 may allocate one or more specific physical sub-units of the acceleration unit (e.g., the encryption acceleration unit 208) to allocate the specified capacity (e.g., 2%) to the virtual machine. The sub-units may be, for example, one or more cores of the acceleration unit (e.g., the encryption acceleration unit 208). In the illustrative embodiment, the network device 106 may hot plug the selected acceleration unit 206 to the virtual machine via a virtual peripheral component interconnect express (PCIe) bus. Further, the virtual machine may characterize and load the driver for the hot plugged acceleration unit 206 and notify the processes (i.e., applications) that were identified as using most of the compute resources of the network device 106. For example, in the illustrative embodiment, the virtual machine may notify the processes using Linux signals or interrupts or other similar signals or interrupts. Subsequently, the notified processes (i.e., applications) may use the newly allocated (e.g., hot plugged) acceleration unit 206 to accelerate processing of the workload of the virtual machine and reduce the compute usage value associated with the virtual machine.

In block 654, the network device 106 may migrate the virtual machine from the standard instructions associated the CPU 202 to the acceleration unit instructions associated with the specific architecture of the acceleration unit, to enable accelerated processing of the workload. In block 656, the network device 106 determines whether processing of the received network packet is complete. If not, the method 600 loops back to block 608 of FIG. 6 to continue analyzing the performance of the VMs as the network packet is being processed; otherwise the method 600 advances to block 658. In block 658, the network device 106 transmits output packets, based on the received and processed network packet from blocks 602 and 608, to one or more target computing devices (e.g., the source endpoint node 102, another network device 106, and/or the destination endpoint node 108). The method 600 then advances to block 602 of FIG. 6 to receive another packet from another computing device.

Referring back to block 626 of FIG. 7, if the network device 106 determines not to accelerate the virtual machine (e.g., that the present compute usage value is not greater than the compute capability usage limit), then the method 600 advances to block 628, in which the network device 106 may release any unused acceleration unit capacity from the virtual machine. Accordingly, in such embodiments, the network device 106 may update the allocated acceleration unit data 306 to indicate that the deallocated acceleration unit capacity is now available to be allocated to a virtual machine. Further, in block 630, the network device 106 may migrate the virtual machine from the acceleration unit instructions associated with the acceleration unit to the standard instructions associated with the CPU 202. From block 630, the method 600 proceeds to block 656 of FIG. 8, wherein the network device 106 determines whether processing of the received network packet is complete.

While the blocks of the method 600 have been described in sequence, it should be understood that many of the blocks may be performed in parallel with other blocks. For example, the network device 106 may receive, process, and transmit data packets (e.g., blocks 602, 608, and 658) in parallel with the allocation and deallocation of acceleration units. Further, the network device 106 may evaluate the present compute usage values of the various virtual machines and assign available acceleration unit processing capacity to the virtual machines in parallel, rather than sequentially.

It should be appreciated that at least a portion of the methods 500 and 600 may be embodied as various instructions stored on a computer-readable media, which may be executed by the CPU 202, one or more of the acceleration unit units 206, the communication circuitry 218, and/or other components of the network device 106 to cause the network device 106 to perform the methods 500 and 600. The computer-readable media may be embodied as any type of media capable of being read by the network device 106 including, but not limited to, the main memory 214, the data storage device 216, a local memory (not shown) of the NIC 220 of the communication circuitry 218, other memory or data storage devices of the network device 106, portable media readable by a peripheral device of the network device 106, and/or other media.

EXAMPLES

Illustrative examples of the technologies disclosed herein are provided below. An embodiment of the technologies may include any one or more, and any combination of, the examples described below.

Example 1 includes a network device to dynamically allocate acceleration units of the network device, the network device comprising one or more processors; one or more acceleration units; and one or more memory devices having stored therein a plurality of instructions that, when executed by the one or more processors, cause the network device to determine an assigned compute capability usage limit associated with a virtual machine executed by the network device; determine a present compute usage value associated with a workload of the virtual machine; determine whether acceleration is needed as a function of the present compute usage and the assigned compute capability usage limit; select, in response to a determination that acceleration is needed, an acceleration unit from the one or more acceleration units as a function of a type of the workload; and allocate at least a portion of the selected acceleration unit to the virtual machine.

Example 2 includes the subject matter of Example 1, and wherein to determine whether acceleration is needed comprises to determine that the present compute usage value exceeds the assigned compute capability usage limit.

Example 3 includes the subject matter of Examples 1 and 2, and wherein the plurality of instructions, when executed by the one or more processors, further cause the network device to determine a required amount of acceleration unit capacity for the virtual machine; and allocate the required amount of acceleration unit capacity to the virtual machine, wherein the required amount of acceleration unit capacity is an amount of acceleration unit capacity required to reduce the present compute usage value of the virtual machine to be less than the assigned compute capability usage limit of the virtual machine.

Example 4 includes the subject matter of any of Examples 1-3, and wherein the plurality of instructions, when executed by the one or more processors, further cause the network device to determine a required amount of acceleration unit capacity for the virtual machine; determine a present unused capacity of the selected acceleration unit; determine whether the amount of unused capacity of the selected acceleration unit is at least equal to the required amount; and allocate the required amount of acceleration unit capacity to the virtual machine in response to a determination that the amount of unused capacity is at least equal to the required amount, wherein the required amount of acceleration unit capacity is an amount of acceleration unit capacity required to reduce the present compute usage value of the virtual machine to be less than the assigned compute capability usage limit of the virtual machine.

Example 5 includes the subject matter of any of Examples 1-4, and wherein the plurality of instructions, when executed by the one or more processors, further cause the network device to identify a process executed by the virtual machine in association with the workload, wherein selection of the acceleration unit is based on the identified process.

Example 6 includes the subject matter of any of Examples 1-5, and wherein the plurality of instructions, when executed by the one or more processors, further cause the network device to generate a performance profile associated with the workload, wherein the performance profile characterizes the workload of the virtual machine, and wherein selection of the acceleration unit is based on the performance profile.

Example 7 includes the subject matter of any of Examples 1-6, and wherein the plurality of instructions, when executed by the one or more processors, further cause the network device to select the acceleration unit based on at least one predefined acceleration unit assignment rule that associates workload types with respective acceleration units.

Example 8 includes the subject matter of any of Examples 1-7, and wherein the plurality of instructions, when executed by the one or more processors, further cause the network device to determine that the workload is associated with encryption; and wherein to select an acceleration unit comprises to select an encryption acceleration unit based on the determination that the workload is associated with encryption.

Example 9 includes the subject matter of any of Examples 1-8, and wherein the plurality of instructions, when executed by the one or more processors, further cause the network device to determine that the workload is associated with compression; and wherein to select an acceleration unit comprises to select a compression acceleration unit based on the determination that the workload is associated with compression.

Example 10 includes the subject matter of any of Examples 1-9, and wherein the plurality of instructions, when executed by the one or more processors, further cause the network device to determine that the workload is associated with authentication; and wherein to select an acceleration unit comprises to select an authentication acceleration unit based on the determination that the workload is associated with authentication.

Example 11 includes the subject matter of any of Examples 1-10, and wherein to allocate at least a portion of the selected acceleration unit comprises to allocate a process time slot of the selected acceleration unit.

Example 12 includes the subject matter of any of Examples 1-11, and wherein to allocate at least a portion of the selected acceleration unit comprises to allocate a physical sub-unit of the selected acceleration unit.

Example 13 includes the subject matter of any of Examples 1-12, and wherein the plurality of instructions, when executed by the one or more processors, further cause the network device to migrate the virtual machine from standard instructions associated with the one or more processors to acceleration unit instructions associated with the selected acceleration unit after the selected acceleration unit has been allocated.

Example 14 includes the subject matter of any of Examples 1-13, and wherein one or more of the acceleration units is a field programmable gate array.

Example 15 includes the subject matter of any of Examples 1-14, and wherein one or more of the acceleration units is an application specific integrated circuit.

Example 16 includes the subject matter of any of Examples 1-15, and wherein the selected acceleration unit is a first acceleration unit, the workload is a first workload, the virtual machine is a first virtual machine, and the plurality of instructions when executed by the one or more processors, further cause the network device to allocate a second acceleration unit to a second virtual machine that executes concurrently with the first virtual machine and is associated with a second workload.

Example 17 includes the subject matter of any of Examples 1-16, and wherein the workload is a first workload, the virtual machine is a first virtual machine, and the plurality of instructions when executed by the one or more processors, further cause the network device to additionally allocate at least a second portion of the selected acceleration unit to a second virtual machine that executes concurrently with the first virtual machine and is associated with a second workload.

Example 18 includes the subject matter of any of Examples 1-17, and wherein the virtual machine is one of a plurality of virtual machines, and the plurality of instructions, when executed by the one or more processors, further cause the network device to initialize each of the plurality of virtual machines on the network device; assign at least one process to each of the plurality of virtual machines, wherein each process is usable to identify a workload type supported by each virtual machine; assign a maximum compute capability value to each of the initialized virtual machines, wherein the maximum compute capability value defines an amount of allocable computational throughput of one or more of the processors to execute the respective at least one process at each virtual machine; and assign the compute capability usage limit to each initialized virtual machine, wherein the compute capability usage limit defines a portion of the maximum compute capability value.

Example 19 includes the subject matter of any of Examples 1-18, and wherein the plurality of instructions, when executed by the one or more processors, further cause the network device to receive a plurality of network packets from a source computing device; and process each of the received network packets at one or more of the virtual machines based on the processes associated with each of the virtual machines.

Example 20 includes the subject matter of any of Examples 1-19, and wherein the plurality of instructions, when executed by the one or more processors, further cause the network device to process at least a portion of the workload with the selected acceleration unit; determine, after at least the portion of the workload has been processed with the selected acceleration unit, an unused capacity of the selected acceleration unit; and deallocate the determined unused capacity from the first virtual machine.

Example 21 includes a method for dynamically allocating acceleration units of a network device, the method comprising determining, by the network device, an assigned compute capability usage limit associated with a virtual machine executed by the network device; determining, by the network device, a present compute usage value associated with a workload of the virtual machine; determining, by the network device, whether acceleration is needed as a function of the present compute usage and the assigned compute capability usage limit; selecting, by the network device, in response to a determination that acceleration is needed, an acceleration unit from the one or more acceleration units as a function of a type of the workload; and allocating, by the network device, at least a portion of the selected acceleration unit to the virtual machine.

Example 22 includes the subject matter of Example 21, and wherein determining whether acceleration is needed comprises determining, by the network device, that the present compute usage value exceeds the assigned compute capability usage limit.

Example 23 includes the subject matter of any of Examples 21 and 22, further including determining, by the network device, a required amount of acceleration unit capacity for the virtual machine; and allocating, by the network device, the required amount of acceleration unit capacity to the virtual machine, wherein the required amount of acceleration unit capacity is an amount of acceleration unit capacity required to reduce the present compute usage value of the virtual machine to be less than the assigned compute capability usage limit of the virtual machine.

Example 24 includes the subject matter of any of Examples 21-23, and further including determining, by the network device, a required amount of acceleration unit capacity for the virtual machine; determining, by the network device, a present unused capacity of the selected acceleration unit; determining, by the network device, whether the amount of unused capacity of the selected acceleration unit is at least equal to the required amount; and allocating, by the network device, the required amount of acceleration unit capacity to the virtual machine in response to a determination that the amount of unused capacity is at least equal to the required amount, wherein the required amount of acceleration unit capacity is an amount of acceleration unit capacity required to reduce the present compute usage value of the virtual machine to be less than the assigned compute capability usage limit of the virtual machine.

Example 25 includes the subject matter of any of Examples 21-24, and further including identifying, by the network device, a process executed by the virtual machine in association with the workload, wherein selection of the acceleration unit is based on the identified process.

Example 26 includes the subject matter of any of Examples 21-25, and further including generating, by the network device, a performance profile associated with the workload, wherein the performance profile characterizes the workload of the virtual machine; and wherein selecting an acceleration unit comprises selecting the acceleration unit based on the performance profile.

Example 27 includes the subject matter of any of Examples 21-26, and further including selecting, by the network device, the acceleration unit based on at least one predefined acceleration unit assignment rule that associates workload types with respective acceleration units.

Example 28 includes the subject matter of any of Examples 21-27, and further including determining, by the network device, that the workload is associated with encryption; and wherein selecting an acceleration unit comprises selecting an encryption acceleration unit based on the determination that the workload is associated with encryption.

Example 29 includes the subject matter of any of Examples 21-28, and further including determining, by the network device, that the workload is associated with compression; and wherein selecting an acceleration unit comprises selecting a compression acceleration unit based on the determination that the workload is associated with compression.

Example 30 includes the subject matter of any of Examples 21-29, and further including determining, by the network device, that the workload is associated with authentication; and wherein selecting an acceleration unit comprises selecting an authentication acceleration unit based on the determination that the workload is associated with authentication.

Example 31 includes the subject matter of any of Examples 21-30, and wherein allocating at least a portion of the selected acceleration unit comprises allocating a process time slot of the selected acceleration unit.

Example 32 includes the subject matter of any of Examples 21-31, and wherein allocating at least a portion of the selected acceleration unit comprises allocating a physical sub-unit of the selected acceleration unit.

Example 33 includes the subject matter of any of Examples 21-32, and further including migrating the virtual machine from standard instructions associated with the one or more processors to acceleration unit instructions associated with the selected acceleration unit after the selected acceleration unit has been allocated.

Example 34 includes the subject matter of any of Examples 21-33, and wherein selecting the acceleration unit comprises selecting a field programmable gate array.

Example 35 includes the subject matter of any of Examples 21-34, and wherein selecting the acceleration unit comprises selecting an application specific integrated circuit.

Example 36 includes the subject matter of any of Examples 21-35, and wherein the selected acceleration unit is a first acceleration unit, the workload is a first workload, and the virtual machine is a first virtual machine, the method further comprising allocating, by the network device, a second acceleration unit to a second virtual machine that executes concurrently with the first virtual machine and is associated with a second workload.

Example 37 includes the subject matter of any of Examples 21-36, and wherein the workload is a first workload, and the virtual machine is a first virtual machine, the method further comprising allocating, by the network device, at least a second portion of the selected acceleration unit to a second virtual machine that executes concurrently with the first virtual machine and is associated with a second workload.

Example 38 includes the subject matter of any of Examples 21-37, and wherein the virtual machine is one of a plurality of virtual machines, the method further comprising initializing, by the network device, each of the plurality of virtual machines on the network device; assigning, by the network device, at least one process to each of the plurality of virtual machines, wherein each process is usable to identify a workload type supported by each virtual machine; assigning, by the network device, a maximum compute capability value to each of the initialized virtual machines, wherein the maximum compute capability value defines an amount of allocable computational throughput of one or more of the processors to execute the respective at least one process at each virtual machine; and assigning, by the network device, a compute capability usage limit to each initialized virtual machine, wherein the compute capability usage limit defines a portion of the maximum compute capability value.

Example 39 includes the subject matter of any of Examples 21-38, and further including receiving, by the network device, a plurality of network packets from a source computing device; and processing, by the network device, each of the received network packets at one or more of the virtual machines based on the processes associated with each of the virtual machines.

Example 40 includes the subject matter of any of Examples 21-39, and further including processing, by the network device, at least a portion of the workload with the selected acceleration unit; determining, by the network device, after at least the portion of the workload has been processed with the selected acceleration unit, an unused capacity of the selected acceleration unit; and deallocating, by the network device, the determined unused capacity from the first virtual machine.

Example 41 includes a network device comprising a processor; one or more acceleration units; and a memory having stored therein a plurality of instructions that when executed by the processor cause the network device to perform the method of any of Examples 21-40.

Example 42 includes one or more machine readable storage media comprising a plurality of instructions stored thereon that in response to being executed result in a network device performing the method of any of Examples 21-41.

Examples 43 includes A network device to dynamically allocate acceleration units of the network device, the network device comprising one or more acceleration units; performance monitor circuitry to (i) determine an assigned compute capability usage limit associated with a virtual machine executed by the network device; (ii) determine a present compute usage value associated with a workload of the virtual machine; and (iii) determine whether acceleration is needed as a function of the present compute usage and the assigned compute capability usage limit; and resource allocation circuitry to (i) select, in response to a determination that acceleration is needed, an acceleration unit from the one or more acceleration units as a function of a type of the workload; and (ii) allocate at least a portion of the selected acceleration unit to the virtual machine.

Example 44 includes the subject matter of Example 43, and wherein to determine whether acceleration is needed comprises to determine that the present compute usage value exceeds the assigned compute capability usage limit.

Example 45 includes the subject matter of any of Examples 43 and 44, and wherein the resource allocation circuitry is further to determine a required amount of acceleration unit capacity for the virtual machine; and allocate the required amount of acceleration unit capacity to the virtual machine, wherein the required amount of acceleration unit capacity is an amount of acceleration unit capacity required to reduce the present compute usage value of the virtual machine to be less than the assigned compute capability usage limit of the virtual machine.

Example 46 includes the subject matter of any of Examples 43-45, and wherein the resource allocation circuitry is further to determine a required amount of acceleration unit capacity for the virtual machine; determine a present unused capacity of the selected acceleration unit; determine whether the amount of unused capacity of the selected acceleration unit is at least equal to the required amount; and allocate the required amount of acceleration unit capacity to the virtual machine in response to a determination that the amount of unused capacity is at least equal to the required amount, wherein the required amount of acceleration unit capacity is an amount of acceleration unit capacity required to reduce the present compute usage value of the virtual machine to be less than the assigned compute capability usage limit of the virtual machine.

Example 47 includes the subject matter of any of Examples 43-46, and wherein the resource allocation circuitry is further to identify a process executed by the virtual machine in association with the workload, wherein selection of the acceleration unit is based on the identified process.

Example 48 includes the subject matter of any of Examples 43-47, and wherein the performance monitor circuitry is further to generate a performance profile associated with the workload, wherein the performance profile characterizes the workload of the virtual machine, and wherein selection of the acceleration unit is based on the performance profile.

Example 49 includes the subject matter of any of Examples 43-48, and wherein the resource allocation circuitry is further to select the acceleration unit based on at least one predefined acceleration unit assignment rule that associates workload types with respective acceleration units.

Example 50 includes the subject matter of any of Examples 43-49, and wherein the resource allocation circuitry is further to determine that the workload is associated with encryption; and wherein to select an acceleration unit comprises to select an encryption acceleration unit based on the determination that the workload is associated with encryption.

Example 51 includes the subject matter of any of Examples 43-50, and wherein the resource allocation circuitry is further to determine that the workload is associated with compression; and wherein to select an acceleration unit comprises to select a compression acceleration unit based on the determination that the workload is associated with compression.

Example 52 includes the subject matter of any of Examples 43-51, and wherein the resource allocation circuitry is further to determine that the workload is associated with authentication; and wherein to select an acceleration unit comprises to select an authentication acceleration unit based on the determination that the workload is associated with authentication.

Example 53 includes the subject matter of any of Examples 43-52, and wherein to allocate at least a portion of the selected acceleration unit comprises to allocate a process time slot of the selected acceleration unit.

Example 54 includes the subject matter of any of Examples 43-53, and wherein to allocate at least a portion of the selected acceleration unit comprises to allocate a physical sub-unit of the selected acceleration unit.

Example 55 includes the subject matter of any of Examples 43-54, and wherein the resource allocation circuitry is further to migrate the virtual machine from standard instructions associated with the one or more processors to acceleration unit instructions associated with the selected acceleration unit after the selected acceleration unit has been allocated.

Example 56 includes the subject matter of any of Examples 43-55, and wherein one or more of the acceleration units is a field programmable gate array.

Example 57 includes the subject matter of any of Examples 43-56, and wherein one or more of the acceleration units is an application specific integrated circuit.

Example 58 includes the subject matter of any of Examples 43-57, and wherein the selected acceleration unit is a first acceleration unit, the workload is a first workload, the virtual machine is a first virtual machine, and the resource allocation circuitry is further to allocate a second acceleration unit to a second virtual machine that executes concurrently with the first virtual machine and is associated with a second workload.

Example 59 includes the subject matter of any of Examples 43-58, and wherein the workload is a first workload, the virtual machine is a first virtual machine, and the resource allocation circuitry is further to allocate at least a second portion of the selected acceleration unit to a second virtual machine that executes concurrently with the first virtual machine and is associated with a second workload.

Example 60 includes the subject matter of any of Examples 43-59, and wherein the virtual machine is one of a plurality of virtual machines, and the network device further comprises virtual machine (VM) management circuitry to initialize each of the plurality of virtual machines on the network device; assign at least one process to each of the plurality of virtual machines, wherein each process is usable to identify a workload type supported by each virtual machine; assign a maximum compute capability value to each of the initialized virtual machines, wherein the maximum compute capability value defines an amount of allocable computational throughput of one or more of the processors to execute the respective at least one process at each virtual machine; and assign the compute capability usage limit to each initialized virtual machine, wherein the compute capability usage limit defines a portion of the maximum compute capability value.

Example 61 includes the subject matter of any of Examples 43-60, and further including network communication circuitry to receive a plurality of network packets from a source computing device; and the VM management circuitry is further to process each of the received network packets at one or more of the virtual machines based on the processes associated with each of the virtual machines.

Example 62 includes the subject matter of any of Examples 43-61, and further including virtual machine (VM) management circuitry to process at least a portion of the workload with the selected acceleration unit; and wherein the resource allocation circuitry is further to determine, after at least the portion of the workload has been processed with the selected acceleration unit, an unused capacity of the selected acceleration unit; and deallocate the determined unused capacity from the first virtual machine.

Example 63 includes a network device comprising means for dynamically allocating one or more acceleration units of the network device, the network device comprising means for determining an assigned compute capability usage limit associated with a virtual machine executed by the network device; means for determining a present compute usage value associated with a workload of the virtual machine; means for determining whether acceleration is needed as a function of the present compute usage and the assigned compute capability usage limit; means for selecting in response to a determination that acceleration is needed, an acceleration unit from the one or more acceleration units as a function of a type of the workload; and means for allocating at least a portion of the selected acceleration unit to the virtual machine.

Example 64 includes the subject matter of Example 63, and wherein the means for determining whether acceleration is needed comprises means for determining that the present compute usage value exceeds the assigned compute capability usage limit.

Example 65 includes the subject matter of any of Examples 63 and 64, and further including means for determining a required amount of acceleration unit capacity for the virtual machine; and means for allocating the required amount of acceleration unit capacity to the virtual machine, wherein the required amount of acceleration unit capacity is an amount of acceleration unit capacity required to reduce the present compute usage value of the virtual machine to be less than the assigned compute capability usage limit of the virtual machine.

Example 66 includes the subject matter of any of Examples 63-65, and further including means for determining a required amount of acceleration unit capacity for the virtual machine; means for determining a present unused capacity of the selected acceleration unit; means for determining whether the amount of unused capacity of the selected acceleration unit is at least equal to the required amount; and means for allocating the required amount of acceleration unit capacity to the virtual machine in response to a determination that the amount of unused capacity is at least equal to the required amount, wherein the required amount of acceleration unit capacity is an amount of acceleration unit capacity required to reduce the present compute usage value of the virtual machine to be less than the assigned compute capability usage limit of the virtual machine.

Example 67 includes the subject matter of any of Examples 63-66, and further including means for identifying a process executed by the virtual machine in association with the workload, wherein selection of the acceleration unit is based on the identified process.

Example 68 includes the subject matter of any of Examples 63-67, and further including means for generating a performance profile associated with the workload, wherein the performance profile characterizes the workload of the virtual machine; and wherein the means for selecting an acceleration unit comprises means for selecting the acceleration unit based on the performance profile.

Example 69 includes the subject matter of any of Examples 63-68, and further including means for selecting the acceleration unit based on at least one predefined acceleration unit assignment rule that associates workload types with respective acceleration units.

Example 70 includes the subject matter of any of Examples 63-69, and further including means for determining that the workload is associated with encryption; and wherein the means for selecting an acceleration unit comprises means for selecting an encryption acceleration unit based on the determination that the workload is associated with encryption.

Example 71 includes the subject matter of any of Examples 63-70, and further including means for determining that the workload is associated with compression; and wherein the means for selecting an acceleration unit comprises means for selecting a compression acceleration unit based on the determination that the workload is associated with compression.

Example 72 includes the subject matter of any of Examples 63-71, and further including means for determining that the workload is associated with authentication; and wherein the means for selecting an acceleration unit comprises means for selecting an authentication acceleration unit based on the determination that the workload is associated with authentication.

Example 73 includes the subject matter of any of Examples 63-72, and wherein the means for allocating at least a portion of the selected acceleration unit comprises means for allocating a process time slot of the selected acceleration unit.

Example 74 includes the subject matter of any of Examples 63-73, and wherein the means for allocating at least a portion of the selected acceleration unit comprises means for allocating a physical sub-unit of the selected acceleration unit.

Example 75 includes the subject matter of any of Examples 63-74, and further including means for migrating the virtual machine from standard instructions associated with the one or more processors to acceleration unit instructions associated with the selected acceleration unit after the selected acceleration unit has been allocated.

Example 76 includes the subject matter of any of Examples 63-75, and wherein the means for selecting the acceleration unit comprises means for selecting a field programmable gate array.

Example 77 includes the subject matter of any of Examples 63-76, and wherein the means for selecting the acceleration unit comprises means for selecting an application specific integrated circuit.

Example 78 includes the subject matter of any of Examples 63-77, and wherein the selected acceleration unit is a first acceleration unit, the workload is a first workload, and the virtual machine is a first virtual machine, the network device further comprising means for allocating a second acceleration unit to a second virtual machine that executes concurrently with the first virtual machine and is associated with a second workload.

Example 79 includes the subject matter of any of Examples 63-78, and wherein the workload is a first workload, and the virtual machine is a first virtual machine, the network device further comprising means for allocating at least a second portion of the selected acceleration unit to a second virtual machine that executes concurrently with the first virtual machine and is associated with a second workload.

Example 80 includes the subject matter of any of Examples 63-79, and wherein the virtual machine is one of a plurality of virtual machines, the network device further comprising virtual machine (VM) management circuitry for initializing each of the plurality of virtual machines on the network device; assigning at least one process to each of the plurality of virtual machines, wherein each process is usable to identify a workload type supported by each virtual machine; assigning a maximum compute capability value to each of the initialized virtual machines, wherein the maximum compute capability value defines an amount of allocable computational throughput of one or more of the processors to execute the respective at least one process at each virtual machine; and assigning a compute capability usage limit to each initialized virtual machine, wherein the compute capability usage limit defines a portion of the maximum compute capability value.

Example 81 includes the subject matter of any of Examples 63-80, and further including network communication circuitry for receiving a plurality of network packets from a source computing device; and the VM management circuitry is further for processing each of the received network packets at one or more of the virtual machines based on the processes associated with each of the virtual machines.

Example 82 includes the subject matter of any of Examples 63-81, and further comprising means for processing at least a portion of the workload with the selected acceleration unit; means for determining after at least the portion of the workload has been processed with the selected acceleration unit, an unused capacity of the selected acceleration unit; and means for deallocating the determined unused capacity from the first virtual machine.

The invention claimed is:

1. A network device to dynamically allocate acceleration units of the network device, the network device comprising:
   one or more processors;
   one or more acceleration units; and
   one or more memory devices having stored therein a plurality of instructions that, when executed by the one or more processors, cause the network device to:
      determine a present compute usage value associated with a workload of a virtual machine;
      determine whether to accelerate the virtual machine as a function of the present compute usage and a compute capability usage limit;
      select, in response to a determination to accelerate the virtual machine, an acceleration unit from the one or more acceleration units as a function of a type of the workload; and
      allocate at least a portion of the selected acceleration unit to the virtual machine.

2. The network device of claim 1, wherein to determine whether to accelerate the virtual machine comprises to determine that the present compute usage value exceeds the assigned compute capability usage limit.

3. The network device of claim 1, wherein the plurality of instructions, when executed by the one or more processors, further cause the network device to:
   determine an amount of acceleration unit capacity for the virtual machine; and
   allocate the determined amount of acceleration unit capacity to the virtual machine, wherein the determined amount of acceleration unit capacity is an amount of acceleration unit capacity usable to reduce the present compute usage value of the virtual machine to be less than the assigned compute capability usage limit of the virtual machine.

4. The network device of claim 1, wherein the plurality of instructions, when executed by the one or more processors, further cause the network device to:
   determine an amount of acceleration unit capacity for the virtual machine;
   determine a present unused capacity of the selected acceleration unit;
   determine whether the present unused capacity of the selected acceleration unit is at least equal to the determined amount; and
   allocate the determined amount of acceleration unit capacity to the virtual machine in response to a determination that the present unused capacity is at least equal to the determined amount, wherein the determined amount of acceleration unit capacity is an amount of acceleration unit capacity usable to reduce the present compute usage value of the virtual machine to be less than the assigned compute capability usage limit of the virtual machine.

5. The network device of claim 1, wherein the plurality of instructions, when executed by the one or more processors, further cause the network device to identify a process executed by the virtual machine in association with the workload, wherein selection of the acceleration unit is based on the identified process.

6. The network device of claim 1, wherein the plurality of instructions, when executed by the one or more processors, further cause the network device to generate a performance profile associated with the workload, wherein the performance profile characterizes the workload of the virtual machine, and wherein selection of the acceleration unit is based on the performance profile.

7. The network device of claim 1, wherein the plurality of instructions, when executed by the one or more processors, further cause the network device to select the acceleration unit based on at least one predefined acceleration unit assignment rule that associates workload types with respective acceleration units.

8. The network device of claim 1, wherein the plurality of instructions, when executed by the one or more processors, further cause the network device to:
determine that the workload is associated with encryption; and
wherein to select an acceleration unit comprises to select an encryption acceleration unit based on the determination that the workload is associated with encryption.

9. The network device of claim 1, wherein the plurality of instructions, when executed by the one or more processors, further cause the network device to:
determine that the workload is associated with compression; and
wherein to select an acceleration unit comprises to select a compression acceleration unit based on the determination that the workload is associated with compression.

10. The network device of claim 1, wherein the plurality of instructions, when executed by the one or more processors, further cause the network device to:
determine that the workload is associated with authentication; and
wherein to select an acceleration unit comprises to select an authentication acceleration unit based on the determination that the workload is associated with authentication.

11. The network device of claim 1, wherein to allocate at least a portion of the selected acceleration unit comprises to allocate a process time slot of the selected acceleration unit.

12. One or more computer-readable storage media comprising a plurality of instructions stored thereon that in response to being executed cause a network device to:
determine a present compute usage value associated with a workload of a virtual machine;
determine whether to accelerate the virtual machine as a function of the present compute usage and a compute capability usage limit;
select in response to a determination to accelerate the virtual machine, an acceleration unit from one or more acceleration units of the network device as a function of a type of the workload; and
allocate at least a portion of the selected acceleration unit to the virtual machine.

13. The one or more computer-readable storage media of claim 12, wherein to determine whether to accelerate the virtual machine comprises to determine that the present compute usage value exceeds the assigned compute capability usage limit.

14. The one or more computer-readable storage media of claim 12, wherein the plurality of instructions further cause the network device to:
determine an amount of acceleration unit capacity for the virtual machine; and
allocate the determined amount of acceleration unit capacity to the virtual machine, wherein the determined amount of acceleration unit capacity is an amount of acceleration unit capacity usable to reduce the present compute usage value of the virtual machine to be less than the assigned compute capability usage limit of the virtual machine.

15. The one or more computer-readable storage media of claim 12, wherein the plurality of instructions further cause the network device to:
determine an amount of acceleration unit capacity for the virtual machine;
determine a present unused capacity of the selected acceleration unit;
determine whether the present unused capacity of the selected acceleration unit is at least equal to the determined amount; and
allocate the determined amount of acceleration unit capacity to the virtual machine in response to a determination that the present unused capacity is at least equal to the determined amount, wherein the determined amount of acceleration unit capacity is an amount of acceleration unit capacity usable to reduce the present compute usage value of the virtual machine to be less than the assigned compute capability usage limit of the virtual machine.

16. The one or more computer-readable storage media of claim 12, wherein the plurality of instructions further cause the network device to identify a process executed by the virtual machine in association with the workload, wherein selection of the acceleration unit is based on the identified process.

17. The one or more computer-readable storage media of claim 12, wherein the plurality of instructions further cause the network device to:
generate a performance profile associated with the workload, wherein the performance profile characterizes the workload of the virtual machine; and
wherein to select an acceleration unit comprises to select the acceleration unit based on the performance profile.

18. The one or more computer-readable storage media of claim 12, wherein the plurality of instructions further cause the network device to select the acceleration unit based on at least one predefined acceleration unit assignment rule that associates workload types with respective acceleration units.

19. The one or more computer-readable storage media of claim 12, wherein the plurality of instructions further cause the network device to:
determine that the workload is associated with encryption; and
wherein to select an acceleration unit comprises to select an encryption acceleration unit based on the determination that the workload is associated with encryption.

20. The one or more computer-readable storage media of claim 12, wherein the plurality of instructions further cause the network device to:
determine that the workload is associated with compression; and
wherein to select an acceleration unit comprises to select a compression acceleration unit based on the determination that the workload is associated with compression.

21. The one or more computer-readable storage media of claim 12, wherein the plurality of instructions further cause the network device to:
determine that the workload is associated with authentication; and
wherein to select an acceleration unit comprises to select an authentication acceleration unit based on the determination that the workload is associated with authentication.

22. The method of claim 21, further comprising selecting, by the network device, the acceleration unit based on at least one predefined acceleration unit assignment rule that associates workload types with respective acceleration units.

23. The one or more computer-readable storage media of claim 12, wherein to allocate at least a portion of the selected acceleration unit comprises to allocate a process time slot of the selected acceleration unit.

24. A network device comprising means for dynamically allocating one or more acceleration units of the network device, the network device comprising:
   means for determining a present compute usage value associated with a workload of a virtual machine;
   means for determining whether to accelerate the virtual machine as a function of the present compute usage and a compute capability usage limit;
   means for selecting in response to a determination to accelerate the virtual machine, an acceleration unit from the one or more acceleration units as a function of a type of the workload; and
   means for allocating at least a portion of the selected acceleration unit to the virtual machine.

25. The network device of claim 24, wherein the means for determining whether to accelerate the virtual machine comprises means for determining that the present compute usage value exceeds the assigned compute capability usage limit.

26. The network device of claim 24, further comprising:
   means for determining an amount of acceleration unit capacity for the virtual machine; and
   means for allocating the determined amount of acceleration unit capacity to the virtual machine, wherein the determined amount of acceleration unit capacity is an amount of acceleration unit capacity usable to reduce the present compute usage value of the virtual machine to be less than the assigned compute capability usage limit of the virtual machine.

27. A method for dynamically allocating acceleration units of a network device, the method comprising:
   determining, by the network device, a present compute usage value associated with a workload of a virtual machine;
   determining, by the network device, whether to accelerate the virtual machine as a function of the present compute usage and a compute capability usage limit;
   selecting, by the network device, in response to a determination to accelerate the virtual machine, an acceleration unit from the one or more acceleration units as a function of a type of the workload; and
   allocating, by the network device, at least a portion of the selected acceleration unit to the virtual machine.

28. The method of claim 27, wherein determining whether to accelerate the virtual machine comprises determining, by the network device, that the present compute usage value exceeds the assigned compute capability usage limit.

29. The method of claim 27, further comprising:
   determining, by the network device, an amount of acceleration unit capacity for the virtual machine; and
   allocating, by the network device, the determined amount of acceleration unit capacity to the virtual machine, wherein the determined amount of acceleration unit capacity is an amount of acceleration unit capacity usable to reduce the present compute usage value of the virtual machine to be less than the assigned compute capability usage limit of the virtual machine.

30. The method of claim 27, further comprising:
   determining, by the network device, an amount of acceleration unit capacity for the virtual machine;
   determining, by the network device, a present unused capacity of the selected acceleration unit;
   determining, by the network device, whether the present unused capacity of the selected acceleration unit is at least equal to the determined amount; and
   allocating, by the network device, the determined amount of acceleration unit capacity to the virtual machine in response to a determination that the present unused capacity is at least equal to the determined amount, wherein the determined amount of acceleration unit capacity is an amount of acceleration unit capacity usable to reduce the present compute usage value of the virtual machine to be less than the assigned compute capability usage limit of the virtual machine.

31. The method of claim 27, further comprising identifying, by the network device, a process executed by the virtual machine in association with the workload, wherein selection of the acceleration unit is based on the identified process.

32. The method of claim 27, further comprising:
   generating, by the network device, a performance profile associated with the workload, wherein the performance profile characterizes the workload of the virtual machine; and
   wherein selecting an acceleration unit comprises selecting the acceleration unit based on the performance profile.

33. The method of claim 27, further comprising:
   determining, by the network device, that the workload is associated with encryption; and
   wherein selecting an acceleration unit comprises selecting an encryption acceleration unit based on the determination that the workload is associated with encryption.

34. The method of claim 27, further comprising:
   determining, by the network device, that the workload is associated with compression; and
   wherein selecting an acceleration unit comprises selecting a compression acceleration unit based on the determination that the workload is associated with compression.

35. The method of claim 27, further comprising:
   determining, by the network device, that the workload is associated with authentication; and
   wherein selecting an acceleration unit comprises selecting an authentication acceleration unit based on the determination that the workload is associated with authentication.

36. The method of claim 27, wherein allocating at least a portion of the selected acceleration unit comprises allocating a process time slot of the selected acceleration unit.

* * * * *